UNITED STATES PATENT OFFICE.

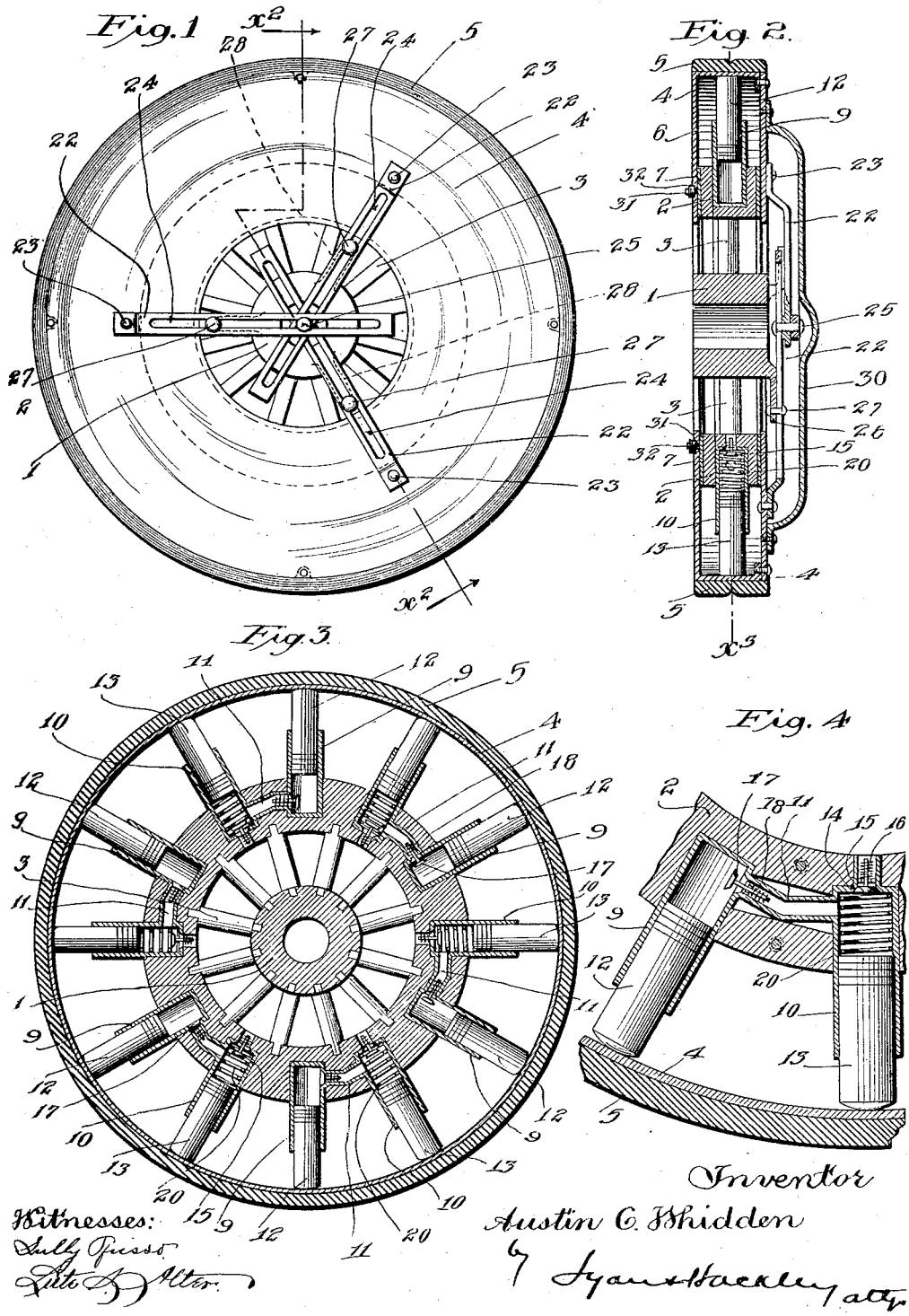

AUSTIN C. WHIDDEN, OF LANCASTER, CALIFORNIA.

RESILIENT WHEEL.

1,111,280.  Specification of Letters Patent.   Patented Sept. 22, 1914.

Application filed October 13, 1913. Serial No. 794,860.

*To all whom it may concern:*

Be it known that I, AUSTIN C. WHIDDEN, a citizen of the United States, residing at Lancaster, in the county of Los Angeles and State of California, have invented a new and useful Resilient Wheel, of which the following is a specification.

This invention relates to a wheel for automobiles, motor trucks, etc., and the main object of the invention is to dispense with the usual pneumatic tire, while providing a wheel having substantially the resiliency of a pneumatic tire wheel.

Other objects of the invention will appear hereinafter.

The accompanying drawings illustrate an embodiment of my invention, and referring thereto:

Figure 1 is a side elevation of the wheel. Fig. 2 is a section on line $x^2$—$x^2$ thereof. Fig. 3 is a section on line $x^3$—$x^3$, Fig. 2. Fig. 4 is a fragmentary section showing one of the pneumatic spring elements with its pump.

The wheel comprises a hub 1, an inner rim connected to said hub 2, for example, by spokes 3, an outer rim 4, and pneumatic resilient means interposed between said inner and outer rims. The outer rim 4 is provided with any suitable shoe or tread member 5, for example, of solid rubber, and is formed with annular side walls or flanges 6 adapted to embrace and slide on the inner rim 2. In case said inner rim 2 is formed of wood, it is provided with metal bearing plates 7 for sliding engagement with the flanges 6 of the outer rim. A series of pneumatic devices are disposed between the inner and outer rims, each of said devices comprising a pneumatic spring cylinder 9, a pump cylinder 10 communicating with said pneumatic spring cylinder 9 by a passage or pipe 11 and plungers 12 and 13 working in the respective cylinders 9 and 10. The cylinders 9 and 10 are secured to the inner rim 2, and the plungers 12 and 13 engage at their outer ends with the inside face of the outer rim, and are preferably rounded convex at their outer ends to enable them to slide more readily on such face. The pump cylinder 10 is provided with an intake passage or port 14 having a check valve 15 normally closed by the spring 16, and an outlet valve 17 is provided in the passage 11 normally closed by the spring 18. Suitable means such as a spring 20 is provided for holding the pump plungers 12 to outermost position.

In order to cause the inner and outer rims to rotate together, I prefer to use connections shown in Figs. 1 and 2, bars 22 being pivoted at 23 on the outer rim and extending inwardly past the center of the wheel, said bars crossing and overlapping one another and being longitudinally slotted as at 24 to receive a pivot pin 25, which passes through the slots 24 of all of said bars and forms a floating pivot for connecting all of the bars at the center of the wheel. Pins 27 connected to the hub 1, for example, by a spider 28, engage in the respective slots 24 of the several bars 22, so as to force the said bars and the outer rim to rotate with the hub when the latter is rotated or vice versa. In case, however, there is any lateral movement of the inner rim and hub, the slotted arms or bars 22 will allow such movement by turning on their pivots and by slipping on the several pins 27. Thus, in case the hub moves downward from the position shown in Fig. 1, the horizontally extending bar 22 will swing downwardly on its pivot and the pivot pin 25 will ride downwardly in the respective slots 24 of the other two bars 22, the upper bar swinging downward and to the right, and the lower bar swinging downward and to the left in this operation.

The operation of the wheel as a resilient wheel is as follows: As each pump cylinder 10 is, by the revolution of the wheel, brought into the lower part of the wheel, if a load is on the wheel, the plunger 13 thereof is pushed into this cylinder 10 by engagement of said plunger with the outer rim 4, which is nearer to the inner rim at the lower portion of the wheel than it is at the upper portion of the wheel, owing to the load on the wheel. This movement of plunger 13 causes the air to be compressed in the pump cylinder, and valve 17 being opened under this pressure, a certain amount of air is pressed into the pneumatic spring cylinder 9 communicating with said pump cylinder. The pump cylinder 10 for each pneumatic device located somewhat in advance of the cylinder 9 of the corresponding pneumatic device in the direction of rotation of the wheel, or said cylinders are otherwise so arranged that the maximum compression in each cylinder 10 is non-simultaneous with the maximum compression in the corresponding cylinder 9, so as to permit of this pumping action. This operation being repeated at each revolution and taking place in each one of the pairs of pump and spring cylinders, compressed air is accumulated in each of the pneumatic cylinders until the resiliency of such cylinders becomes sufficient to sustain the load. The valves may be so proportioned that when the proper pressure is attained, the outlet valve 17 fails to open on the compression stroke, or the inlet valve 15 fails to open on the suction stroke, so that the accumulation of pressure is automatically limited. It will be seen that by providing a considerable number of pairs of cylinders, a sufficient number may always be presented at the lower part of the wheel to assure a continuous sustaining action in the revolution of the wheel. Outer rim 4 is provided with recesses 31 for holding grease, and closed by screw plugs 32. A cover 30 is secured on the outer rim and extends over the bars 22.

What I claim is:

A resilient wheel comprising outer and inner rim members, a plurality of sets of pneumatic devices each comprising a pump cylinder and a spring cylinder arranged one in advance of the other and carried by one of said members, plungers working in said cylinders and engaging the other of said members, each of said pump cylinders being provided with an air inlet and a check valve in said inlet, the pump and spring cylinders of each pneumatic device being connected together and pneumatically disconnected from the other pneumatic device, and a check valve in the pneumatic connection of the pump and spring cylinders of each pneumatic device to allow air to be pumped by the pump cylinder into the corresponding spring cylinder and to be retained in said spring cylinder.

In testimony whereof, I have hereunto set my hand at California this 7th day of October, 1913.

AUSTIN C. WHIDDEN.

In presence of—
ELLSWORTH M. TAYLOR,
H. E. GLIDDEN.

---

Copies of this patent may be obtained for five cents each, by addressing the "Commissioner of Patents, Washington, D. C."